(No Model.)
W. MOSLEY.
NAIL TONGS.
No. 322,195. Patented July 14, 1885.
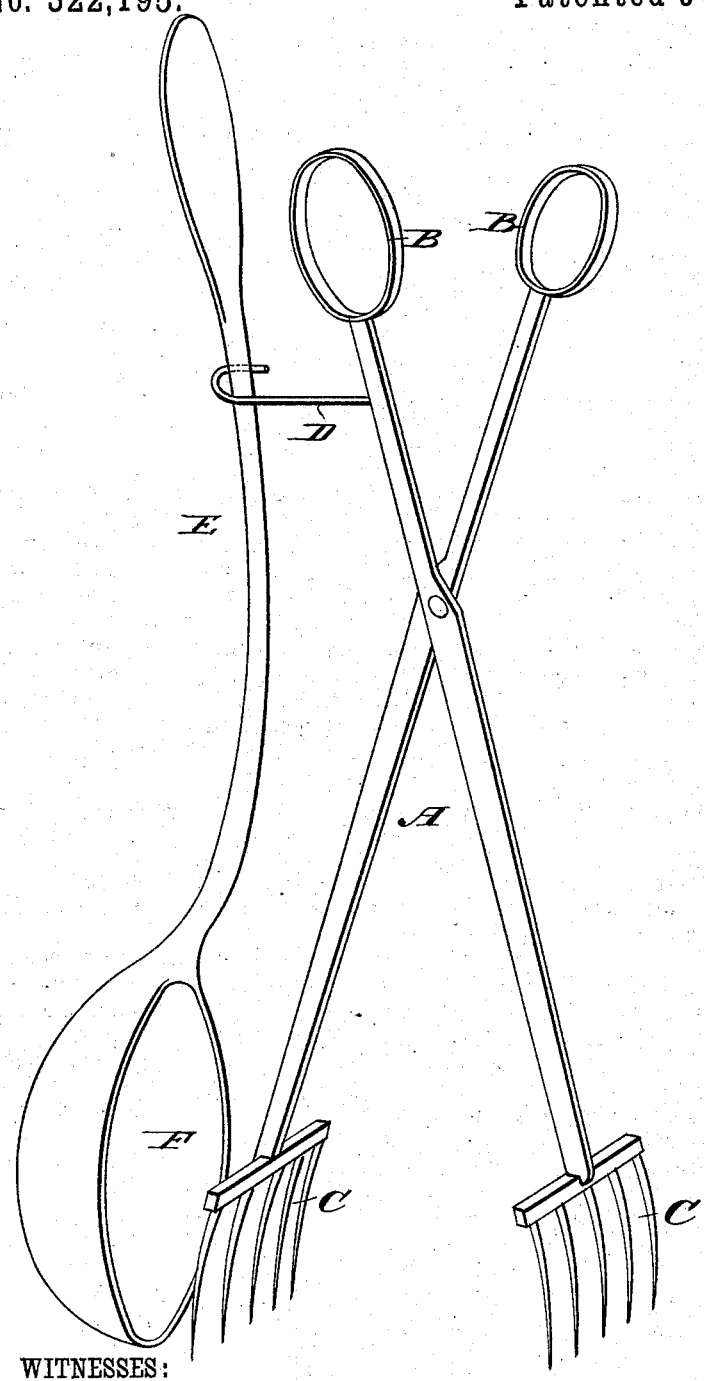
WITNESSES:
INVENTOR:
W. Mosley
BY Munn & Co
ATTORNEYS.

UNITED STATES PATENT OFFICE.

WOODSON MOSLEY, OF KINGSLAND, ARKANSAS.

NAIL-TONGS.

SPECIFICATION forming part of Letters Patent No. 322,195, dated July 14, 1885.

Application filed January 23, 1885. (No model.)

*To all whom it may concern:*

Be it known that I, WOODSON MOSLEY, of Kingsland, in the county of Dorsey and State of Arkansas, have invented a new and Improved Nail-Tongs, of which the following is a full, clear, and exact description.

The object of my invention is to provide new and improved nail-tongs for facilitating the removal of nails from nail-boxes, nail-trays, &c.

The invention consists in a pair of pivoted hand nail-tongs having a hook secured to the under side of one of the levers for retaining the handle of a scoop, as will be hereinafter described and claimed.

Reference is to be had to the accompanying drawing, forming part of this specification, in which a perspective view of my improved nail-tongs is shown.

Two levers, A, each provided at one end with a handle-loop, B, and at the opposite end with a fork, C, having a series of tines pivoted to each other in the same manner as the blades of scissors are pivoted, so that by pressing the handle ends together the forks will also be moved toward each other. A hook, D, is secured to one lever and projects from the same and supports a handle, E, on one end of which a scoop, F, is formed, either solid or of wires, &c.

The nail-tongs or nail-grab is used by taking hold of the two handles B with the right hand, in the same manner scissors are held, and the scoop-handle is held with the left. The tines of the forks are then thrust into the nails in the keg, tray, or box, and the handles B pressed together, whereby a quantity of nails are grasped by the hooks, which are then emptied into the scoop, and this is repeated until the scoop is filled. A quantity of nails can also be held between the forks while removing the grab and the nails from the keg or box. A greater quantity of nails are thus removed at a time and the dropping of nails is prevented.

Having thus fully described my invention, I claim as new and desire to secure by Letters Patent—

As an improved article of manufacture, a pair of pivoted hand nail-tongs, A B C, one of the levers of which is provided on its under side with the hook D, adapted to retain the handle of a scoop, substantially as set forth.

WOODSON MOSLEY.

Witnesses:
WM. P. THOMAS,
J. W. DOSTER.